United States Patent
Park et al.

(10) Patent No.: US 11,884,808 B2
(45) Date of Patent: Jan. 30, 2024

(54) THERMOPLASTIC RESIN COMPOSITION

(71) Applicant: LG CHEM, LTD., Seoul (KR)

(72) Inventors: Jung Tae Park, Daejeon (KR); Dae Woo Lee, Daejeon (KR); Jae Bum Seo, Daejeon (KR); Gyu Sun Kim, Daejeon (KR); Ji Uk Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 590 days.

(21) Appl. No.: 17/055,941

(22) PCT Filed: Nov. 28, 2019

(86) PCT No.: PCT/KR2019/016522
§ 371 (c)(1),
(2) Date: Nov. 16, 2020

(87) PCT Pub. No.: WO2020/130400
PCT Pub. Date: Jun. 25, 2020

(65) Prior Publication Data
US 2021/0206958 A1 Jul. 8, 2021

(30) Foreign Application Priority Data
Dec. 21, 2018 (KR) .................. 10-2018-0167572

(51) Int. Cl.
| | | |
|---|---|---|
| C08L 33/06 | (2006.01) | |
| C08L 33/12 | (2006.01) | |
| C08L 35/00 | (2006.01) | |
| C08L 51/04 | (2006.01) | |
| C08F 220/18 | (2006.01) | |
| C08L 33/08 | (2006.01) | |
| C08F 220/44 | (2006.01) | |
| C08F 222/40 | (2006.01) | |

(52) U.S. Cl.
CPC .......... C08L 33/062 (2013.01); C08F 220/18 (2013.01); C08F 220/44 (2013.01); C08F 222/40 (2013.01); C08L 33/08 (2013.01); C08L 33/12 (2013.01); C08L 35/00 (2013.01); C08L 51/04 (2013.01); *C08F 2500/21* (2013.01); *C08F 2500/24* (2013.01); *C08L 2201/08* (2013.01); *C08L 2203/30* (2013.01); *C08L 2207/53* (2013.01)

(58) Field of Classification Search
CPC .... C08F 220/18; C08F 220/44; C08F 222/40; C08F 2500/21; C08F 2500/24; C08L 33/062; C08L 33/12; C08L 35/00; C08L 51/04; C08L 33/08; C08L 2203/30; C08L 2207/53; C08L 2201/08
See application file for complete search history.

(56) References Cited

U.S. PATENT DOCUMENTS

| | | | |
|---|---|---|---|
| 6,147,162 A | 11/2000 | Tadokoro et al. | |
| 2008/0085975 A1 | 4/2008 | Saegusa et al. | |
| 2012/0007283 A1 | 1/2012 | Minkwitz | |
| 2012/0010335 A1 | 1/2012 | Minkwitz | |
| 2012/0046408 A1 | 2/2012 | Minkwitz | |
| 2015/0299360 A1 | 10/2015 | Murakami | |
| 2018/0305538 A1 | 10/2018 | Murakami et al. | |
| 2019/0248985 A1 | 8/2019 | Minkwitz | |
| 2020/0385500 A1* | 12/2020 | Kitayama | C08L 33/12 |

FOREIGN PATENT DOCUMENTS

| | | |
|---|---|---|
| CN | 1188488 A | 7/1998 |
| CN | 101090919 A | 12/2007 |
| CN | 103080223 A | 5/2013 |
| CN | 104736373 A | 6/2015 |
| CN | 108350125 A | 7/2018 |
| EP | 1621596 * | 2/2006 |
| EP | 3378878 A1 | 9/2018 |
| JP | S63243156 A | 10/1988 |
| JP | 4802731 B1 | 10/2011 |
| KR | 10-2004-0028383 A | 4/2004 |
| KR | 10-2007-0044625 A | 4/2007 |
| KR | 10-2008-0017778 A | 2/2008 |
| KR | 10-2010-0051368 A | 5/2010 |
| KR | 10-2012-0042802 A | 5/2012 |
| KR | 10-2012-0066197 A | 6/2012 |
| KR | 20120100530 A | 9/2012 |
| KR | 10-1478394 B1 | 12/2014 |
| KR | 20150037378 A | 4/2015 |
| KR | 10-2016-0072961 A | 6/2016 |
| KR | 10-2017-0027861 A | 3/2017 |
| KR | 10-1829487 B1 | 2/2018 |
| WO | WO03080724 A1 | 10/2003 |
| WO | WO2013085090 A1 | 6/2013 |

OTHER PUBLICATIONS

Machine English translation of JP S63-243156, Yumoto et al., Oct. 11, 1988.*
Extended European Search Report for EP Application 19900029.0, dated Jun. 29, 2021.
Liu Jiping, "Nanotechnology in Textile Science China Textile Press", China Textile Press, May 31, 2003.
Dong Yongchun, "Chemistry and Application of Textile Auxiliary", China Textile Press, Jul. 31, 2007.

* cited by examiner

*Primary Examiner* — Patrick D Niland

(57) ABSTRACT

The present invention relates to a thermoplastic resin composition, which includes a first copolymer formed by polymerizing a monomer mixture of a (meth)acrylate-based monomer, a vinyl cyan-based monomer and a maleimide-based monomer, and having a refractive index of 1.5170 or less and a glass transition temperature of 115.0° C. or more; and a second copolymer formed by graft-copolymerizing an aromatic vinyl-based monomer and a vinyl cyan-based monomer onto an acrylic rubber polymer, and the thermoplastic resin composition according to the present invention has improved heat resistance, colorability and scratch resistance.

13 Claims, No Drawings

THERMOPLASTIC RESIN COMPOSITION

CROSS-REFERENCE TO RELATED APPLICATIONS

The present application is a National Phase entry of International Application No. PCT/KR2019/016522, filed Nov. 28, 2019, which claims priority to and the benefit of Korean Patent Application No. 10-2018-0167572, filed on Dec. 21, 2018, the disclosures of which are incorporated herein by reference in their entirety.

The present invention relates to a thermoplastic resin composition, and more particularly, to a thermoplastic resin composition having improved heat resistance, colorability and scratch resistance.

BACKGROUND ART

Conventionally, an ABS graft copolymer and a copolymer using an α-methyl styrene as a monomer were used as heat-resistant resin compositions. Since the heat-resistant resin composition is mainly used as exterior materials for automobiles and home appliances, not only heat resistance, but also scratch resistance was considered significant.

Meanwhile, to be used as an exterior material, weather resistance is also a very important factor. However, there was a limit to improving weather resistance with a heat-resistant resin composition including an ABS graft copolymer. While the replacement of the ABS graft copolymer with an ASA graft copolymer was able to improve the weather resistance, it has a limit in improving heat resistance and scratch resistance.

Therefore, the development of a thermoplastic resin composition having excellent colorability, heat resistance, scratch resistance and weather resistance is required.

DISCLOSURE

Technical Problem

The present invention is directed to providing a thermoplastic resin composition having excellent colorability, heat resistance and scratch resistance. In addition, the present invention is directed to providing a thermoplastic resin composition also having excellent weather resistance.

Technical Solution

To solve the above-mentioned problems, the present invention provides a thermoplastic resin composition, which includes a first copolymer formed by polymerizing a monomer mixture of a (meth)acrylate-based monomer, a vinyl cyan-based monomer and a maleimide-based monomer, and has a refractive index of 1.5170 or less and a glass transition temperature of 115.0° C. or more; and a second copolymer formed by graft-copolymerizing an aromatic vinyl-based monomer and a vinyl cyan-based monomer onto an acrylic rubber polymer.

In addition, the present invention provides a thermoplastic resin molded part, which is made of the above-described thermoplastic resin composition, and has a heat deflection temperature of 92.5° C. or more, an L value of 25.3 or less, and a pencil hardness of HB or more.

Advantageous Effects

A thermoplastic resin composition according to the present invention can exhibit excellent heat resistance, colorability and scratch resistance. In addition, the thermoplastic resin composition according to the present invention can have further improved weather resistance due to a synergistic action between a first copolymer and a second copolymer.

Modes of the Invention

Hereinafter, the present invention will be described in further detail to help in understanding the present invention.

Terms and words used in the specification and claims should not be construed as limited to general or dictionary meanings, and based on the principle that the inventors have appropriately defined the concepts of terms in order to explain the invention in the best way, the terms and words should be interpreted with the meaning and concept which are consistent with the technical spirit of the present invention.

In the present invention, a refractive index may be measured using an Abbe refractometer.

In the present invention, a glass transition temperature may be measured by differential scanning calorimetry.

In the present invention, a heat deflection temperature may be measured according to ASTM D648.

In the present invention, an L value may be measured using HunterLab.

In the present invention, a pencil hardness may be measured by fixing a pencil at a load of 0.5 kg and an angle of 45°, scratching the surface of a specimen, and visually checking whether the surface of the specimen is scratched by the pencil hardness.

In the present invention, the average particle diameter of the acrylic rubber polymer may be measured by dynamic light scattering, and particularly, using Nicomp 380 HPL (Trade name, Manufacturer: Particle Sizing Systems LLC).

In the specification, an average particle diameter means an arithmetic average particle diameter in the particle size distribution measured by dynamic light scattering, that is, a scattering intensity-based average particle diameter.

In the present invention, the (meth)acrylate-based monomer may be an alkyl (meth)acrylate-based monomer, and preferably, a $C_1$ to $C_{10}$ alkyl (meth)acrylate. The (meth)acrylate-based monomer may be one or more selected from the group consisting of methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, isononyl (meth)acrylate and decyl (meth)acrylate, and preferably, one or more selected from the group consisting of methyl methacrylate and butyl acrylate.

In the present invention, the vinyl cyan-based monomer may be one or more selected from acrylonitrile, methacrylonitrile, ethacrylate, phenyl acrylonitrile, α-chloroacrylonitrile and ethacrylonitrile, and preferably, acrylonitrile.

In the present invention, the maleimide-based monomer may be one or more selected from the group consisting of maleimide, N-methyl maleimide, N-ethyl maleimide, N-propyl maleimide, N-isopropyl maleimide, N-butyl maleimide, N-isobutyl maleimide, N-t-butyl maleimide, N-lauryl maleimide, N-cyclohexyl maleimide, N-phenyl maleimide, N-(4-chlorophenyl) maleimide, 2-methyl-N-phenyl maleimide, N-(4-bromophenyl) maleimide, N-(4-nitrophenyl) maleimide, N-(4-hydroxyphenyl) maleimide, N-(4-methoxyphenyl) maleimide, N-(4-carboxyphenyl) maleimide and N-benzyl maleimide, and preferably, N-phenyl maleimide.

In the present invention, the aromatic vinyl-based monomer may be one or more selected from the group consisting of styrene, α-methyl styrene, α-ethyl styrene and p-methyl styrene, and preferably, styrene.

1. Thermoplastic Resin Composition

A thermoplastic resin composition according to an exemplary embodiment of the present invention includes 1) a first copolymer formed by polymerizing a monomer mixture of a (meth)acrylate-based monomer, a vinyl cyan-based monomer and a maleimide-based monomer, and having a refractive index of 1.5170 or less and a glass transition temperature of 115.0° C. or more; and 2) a second copolymer formed by graft-copolymerizing an aromatic vinyl-based monomer and a vinyl cyan-based monomer onto an acrylic rubber polymer.

Hereinafter, each constituent of a thermoplastic resin composition according to an exemplary embodiment of the present invention will be described in detail.

1) First Copolymer

The first copolymer is formed by polymerizing a monomer mixture including a (meth)acrylate-based monomer, a vinyl cyan-based monomer and a maleimide-based monomer, and has a refractive index of 1.5170 or less and a glass transition temperature of 115.0° C. or more.

The first copolymer may improve the colorability, heat resistance and scratch resistance of the thermoplastic resin composition. In addition, since the first copolymer includes a (meth)acrylate-based monomer, the weather resistance of the thermoplastic resin composition may also be improved due to a synergistic action between the first and second copolymers.

The monomer mixture may include 55 to 74 wt % of the (meth)acrylate-based monomer, 15 to 35 wt % of the vinyl cyan-based monomer and 5 to 12 wt % of the maleimide-based monomer, and preferably, 60 to 72 wt % of the (meth)acrylate-based monomer, 20 to 30 wt % of the vinyl cyan-based monomer and 5 to 10 wt % of the maleimide-based monomer. When the contents of the monomers satisfy the above-described ranges, a first copolymer having a low refractive index and a high glass transition temperature may be prepared. In addition, when the first copolymer is applied to the thermoplastic resin composition, not only the colorability and heat resistance of the thermoplastic resin composition may be improved, but also the scratch resistance and the weather resistance may be improved. Particularly, when the monomer mixture includes the (meth)acrylate-based monomer in the above range, since an increase in the refractive index of the first copolymer may be prevented, a decrease in the colorability of the thermoplastic resin composition may be prevented when the first copolymer is applied to the thermoplastic resin composition. In addition, when the (meth)acrylate-based monomer may be included in the above range, the vinyl cyan-based monomer and the maleimide-based monomer can also be included in a proper ranges, and thus a first copolymer having a high glass transition temperature may be prepared, and when the first copolymer is applied to the thermoplastic resin composition, a decrease in the heat resistance and scratch resistance of the thermoplastic resin composition may be prevented. In addition, when the monomer mixture includes the maleimide-based monomer in the above range, it is possible to prepare the first copolymer having a high glass transition temperature, and thus when the first copolymer is applied to the thermoplastic resin composition, the thermoplastic resin composition exhibits excellent heat resistance. In addition, when the maleimide-based monomer is included in the above range, it is possible to include a (meth)acrylate-based monomer and a vinyl cyan-based monomer in the proper ranges, and thus an increase in the refractive index of the first copolymer may be prevented, and when the first copolymer is applied to the thermoplastic resin composition, the thermoplastic resin composition exhibits excellent colorability and scratch resistance.

Meanwhile, the monomer mixture may include the (meth)acrylate-based monomer and the maleimide-based monomer at a weight ratio of 95:5 to 80:20, 93:7 to 83:17 or 90:10 to 86:14, and preferably, 90:10 to 86:14. When the monomer mixture satisfies the above-mentioned range, a first copolymer having a lower refractive index may be prepared. When the first copolymer is applied to the thermoplastic resin composition, colorability may be improved, and weather resistance may be further improved.

The monomer mixture may include the vinyl cyan-based monomer and the maleimide-based monomer at a weight ratio of 80:20 to 60:40 or 75:25 to 70:30, and preferably 75:25 to 70:30. When the monomer mixture satisfies the above-mentioned range, even when the maleimide-based monomer is included in the monomer mixture at the same content, a first copolymer having a high glass transition temperature may be prepared, and when the first copolymer is applied to the thermoplastic resin composition, the heat resistance of the thermoplastic resin composition may be further improved.

It is preferable that the monomer mixture does not include an aromatic vinyl-based compound. This is because, when the monomer mixture includes an aromatic vinyl-based monomer, and specifically, an alkyl-substituted styrene-based monomer, a first copolymer having a significantly high refractive index as well as a high glass transition temperature may be prepared.

The first copolymer may have a refractive index of 1.5170 or less, and preferably, 1.5000 to 1.5170. In addition, the copolymer may have a glass transition temperature of 115.0° C. or more, and preferably, 115.0 to 129.0° C. When the first copolymer satisfies the above-mentioned conditions, a balance between colorability and heat resistance may be achieved, and therefore, when the copolymer is applied to the thermoplastic resin composition, a thermoplastic resin composition excellent in both colorability and heat deflection temperature may be prepared. In addition, as the heat deflection temperature is improved, a thermoplastic resin composition having excellent scratch resistance may be prepared.

The first copolymer may be a methyl (meth)acrylate/acrylonitrile/N-phenyl maleimide copolymer.

The first copolymer may be prepared by bulk-polymerizing the above-described monomer mixture.

2) Second Copolymer

The second copolymer is a graft copolymer formed by graft-copolymerizing an aromatic vinyl-based monomer and a vinyl cyan-based monomer onto an acrylic rubber polymer.

The second copolymer may improve the weather resistance and mechanical properties of the thermoplastic resin composition.

It is preferable that the acrylic rubber polymer have an average particle diameter of 50 to 500 nm or 70 to 450 nm. When the acrylic rubber polymer satisfies the above-mentioned range, a graft copolymer excellent in both weather resistance and mechanical properties may be provided.

The acrylic rubber polymer may be prepared by cross-linking polymerization of a (meth)acrylate-based monomer.

The second copolymer may be a butyl acrylate/styrene/acrylonitrile graft copolymer.

The second copolymer may be a directly prepared or a commercially available material.

The weight ratio of the first copolymer to the second copolymer may be 55:45 to 75:25 or 60:40 to 70:30, and preferably, 60:40 to 70:30. When the weight ratio satisfies the above-mentioned range, heat resistance, scratch resistance and colorability may be significantly improved while maintaining the weather resistance and mechanical properties of the thermoplastic resin composition at suitable levels.

Meanwhile, to improve the mechanical properties, weather resistance, colorability, surface gloss and appearance characteristics of the thermoplastic resin composition, the second copolymer may include two types of graft copolymers, that is, a first graft copolymer and a second graft copolymer, which have different average particle diameters of an acrylic rubber polymer.

The first graft copolymer may be a graft copolymer prepared by graft-copolymerizing an aromatic vinyl-based monomer and a vinyl cyan-based monomer onto an acrylic rubber polymer having an average particle diameter of 50 to 200 nm. Since the first graft copolymer has a large specific surface area due to a small average particle diameter of the acrylic rubber polymer, the tensile strength, colorability, weather resistance, surface gloss and appearance characteristics of the thermoplastic resin composition may be further improved.

In addition, the second graft copolymer may be a graft copolymer prepared by graft-copolymerizing an aromatic vinyl-based monomer and a vinyl cyan-based monomer onto an acrylic rubber polymer having an average particle diameter of 300 to 500 nm. Since the second graft copolymer has a large average particle diameter of the acrylic rubber polymer, the impact strength of the thermoplastic resin composition may be further improved.

The weight ratio of the first graft copolymer and the second graft copolymer may be 75:25 to 95:5 or 80:20 to 90:10, and preferably, 80:20 to 90:10. When the weight ratio satisfies the above-mentioned range, the mechanical properties, colorability and weather resistance of the thermoplastic resin composition may be further improved.

2. Thermoplastic Resin Molded Part

A thermoplastic resin molded part according to a different exemplary embodiment of the present invention may be made of the thermoplastic resin composition according to an exemplary embodiment of the present invention, and have a heat deflection temperature of 92.5° C. or more, an L value of 25.3 or less, and a pencil hardness of HB or more. Preferably, the heat deflection temperature may be 92.5 to 100.0° C., the L value may be 24.0 to 25.3, and the pencil hardness may be HB or more.

Generally, when the thermoplastic resin molded part is made of a thermoplastic resin composition including a second copolymer prepared by graft-copolymerizing an aromatic vinyl-based monomer and a vinyl cyan-based monomer onto an acrylic rubber polymer, it is very difficult to realize a pencil hardness of HB. However, when the thermoplastic resin molded part is made of the thermoplastic resin composition according to the present invention, a pencil hardness of HB or more may be realized. Therefore, the thermoplastic resin molded part of the present invention not only has excellent heat resistance and colorability, but also has remarkably excellent scratch resistance.

Hereinafter, examples of the present invention will be described in detail so that those of ordinary skill in the art can easily carry out the present invention. However, the present invention may be implemented in various different forms, and is not limited to the following examples.

PREPARATION EXAMPLES

A polymerization solution including 90 parts by weight of a monomer mixture shown in Table 1 below, 10 parts by weight of toluene and 0.18 parts by weight of t-butyl peroxy-2-ethylhexanoate as an initiator was prepared. A polymerization product was obtained by polymerization while the polymerization solution was input into a continuous reactor set to 110° C. at a rate of 7 kg/hr. The polymerization product was transferred to a volatilization tank set to 250° C. and 20 torr to remove an unreacted monomer and a solvent, thereby preparing a pellet-type copolymer.

The physical properties of the prepared copolymer were measured by a methods described below, and the results are shown in Table 1.

(1) Refractive index (nD): measured using an Abbe refractometer
(2) Weight average molecular weight (Mw): measured with a relative value with respect to a standard polystyrene (standard PS) specimen using tetrahydrofuran (THF) and gel permeation chromatography (GPC, Waters Breeze)
(3) Glass transition temperature (° C.): measured by differential scanning calorimetry

TABLE 1

| Classification | | 1 | 2 | 3 | 4 | 5 | 6 | 7 | 8 |
|---|---|---|---|---|---|---|---|---|---|
| Copolymer | | A-1 | A-2 | A-3 | A-4 | A-5 | A-6 | A-7 | A-8 |
| Monomer mixture (wt %) | MMA | 60 | 62 | 64 | 72 | 66 | 77 | 35 | 80 |
| | AN | 30 | 30 | 30 | 20 | 30 | 20 | 30 | 20 |
| | PMI | 10 | 8 | 6 | 8 | 14 | 3 | — | — |
| | AMS | — | — | — | — | — | — | 35 | — |
| Refractive index (nD) | | 1.5135 | 1.5102 | 1.5069 | 1.5072 | 1.5222 | 1.5011 | 1.5404 | 1.4950 |
| Weight average molecular weight | | 102,000 | 100,000 | 98,000 | 94,000 | 106,000 | 93,000 | 95,000 | 92,000 |
| Glass transition temperature | | 126.2 | 120.8 | 116.4 | 121.9 | 131.9 | 112.5 | 121.2 | 106.4 |

MMA: methyl methacrylate
AN: acrylonitrile
PMI: N-phenyl maleimide
AMS: α-methyl styrene Examples and Comparative Examples The specifications of the components used in the following examples and comparative examples are as follows.

(A) Acrylic copolymer: The copolymers A-1 to A-8 prepared in Preparation Examples 1 to 8 were used.

(B) Graft copolymer
(B-1): First graft copolymer: SA130 (LG Chem, a copolymer prepared by graft-copolymerizing styrene and acrylonitrile onto a butyl acrylate-based rubber polymer (average particle diameter: 120 nm)) was used.
(B-2): Second graft copolymer: SA927 (LG Chem, a copolymer prepared by graft-copolymerizing styrene and acrylonitrile onto a butyl acrylate-based rubber polymer (average particle diameter: 400 nm)) was used.
(C) Heat resistant copolymer: 100 UH (LG Chem, glass transition temperature: 125° C., weight average molecular weight: 100,000 g/mol) was used.
(D) Low refractive index copolymer: IH830 (LG MMA) was used.

A thermoplastic resin composition was prepared by mixing and stirring the above-described components at contents shown in Table 2 below.

Experimental Example 1

100 parts by weight of each of the thermoplastic resin compositions of Examples and Comparative Examples, 1 part by weight of ethylene-bis-stearamide (EBA) as a lubricant, 0.5 parts by weight of AO-11B (Songwon Industrial Co., Ltd.) as an antioxidant and 0.5 parts by weight of carbon black were uniformly mixed, it was put into an extruder (28 (D) set to 230° C. and extruded to prepare a thermoplastic resin pellet. The thermoplastic resin pellets were injected to prepare a specimen. The physical properties of the specimen were measured by the methods described below, and the results are shown in Table 2 below.

(1) Heat deflection temperature (HDT, ° C.): measured according to ASTM D648.
(2) L value: measured using HunterLab.
(3) Pencil hardness: determined by fixing a pencil at a load of 0.5 kg and an angle of 45° and visually observing whether the surface of a specimen was scratched by the pencil hardness.
(4) Impact strength (¼ In, kg·cm/cm): measured according to ASTM D256.
(5) Tensile strength (kg/cm$^2$): measured according to ASTM D638.
(6) Weather resistance (ΔE): A specimen was left in a weather resistance testing machine (QUV, Atlas) at a UV LAMP luminance of 0.77 W/m$^2$, a humidity of 50% and a BLACK PANEL temperature of 60° C. for 20 hours. ΔE is an arithmetic mean value of HunterLab values before and after being left in the tester, and as the value approaches 0, the better the weather resistance.

$$\Delta E = \sqrt{(L'-L_0)^2 + (a'-a_0)^2 + (b'-b_0)^2}$$

In this formula, L', a' and b' are L, a and b values measured using HunterLab software after a specimen was left under the above-described conditions for 20 hours, and $L_0$, $a_0$ and $b_0$ are L, a and b values measured using the HunterLab before being left in the tester.

TABLE 2

| Classification | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| (A) Acrylic Copolymer (parts by weight) | A-1 | 65 | — | — | — | — | — | — | — | — |
| | A-2 | — | 65 | — | — | — | — | — | — | — |
| | A-3 | — | — | 65 | — | — | — | — | — | — |
| | A-4 | — | — | — | 65 | — | — | — | — | — |
| | A-5 | — | — | — | — | 65 | — | — | — | — |
| | A-6 | — | — | — | — | — | 65 | — | — | — |
| | A-7 | — | — | — | — | — | — | 65 | — | — |
| | A-8 | — | — | — | — | — | — | — | 65 | — |
| (B) Graft copolymer (parts by weight) | B-1 | 30 | 30 | 30 | 30 | 30 | 30 | 30 | 30 | 30 |
| | B-2 | 5 | 5 | 5 | 5 | 5 | 5 | 5 | 5 | 5 |
| (C) Heat resistant copolymer | | — | — | — | — | — | — | — | — | 32.5 |
| (D) Low refractive index copolymer | | — | — | — | — | — | — | — | — | 32.5 |
| L value deflection | | 25.1 | 24.8 | 24.3 | 24.2 | 25.5 | 23.8 | 25.3 | 24.0 | 25.6 |
| Heat deflection temperature | | 97.3 | 95.3 | 93.8 | 95.9 | 99.2 | 91.3 | 95.5 | 85.7 | 92.5 |
| Pencil hardness | | F | F | H | HB | HB | F | HB | H | B |
| Impact strength | | 12.3 | 11.5 | 11.1 | 10.6 | 13.1 | 10.3 | 10.8 | 10.9 | 19.3 |
| Tensile strength | | 523 | 521 | 518 | 511 | 532 | 508 | 515 | 516 | 492 |
| Weather resistance | | 1.7 | 1.6 | 1.5 | 1.5 | 1.8 | 1.4 | 1.8 | 1.4 | 1.9 |

Referring to Table 2, since Examples 1 to 4 used an acrylic copolymer having a low refractive index and a high glass transition temperature, and thus the L value decreased and the heat deflection temperature increased, excellent colorability and heat resistance can be confirmed. In addition, since the pencil hardness was HB or more, and thus scratch resistance is excellent and high impact strength and tensile strength are high, excellent mechanical properties and excellent weather resistance can be confirmed.

Meanwhile, since Comparative Example 1 using an acrylic copolymer having a high refractive index has a high L value, it can be confirmed that not only colorability was degraded but also weather resistance was degraded. It can be confirmed that Comparative Example 2 using an acrylic copolymer having a low glass transition temperature exhibited a low heat deflection temperature and low mechanical properties. In addition, it can be confirmed that Comparative Example 3 using an acrylic copolymer having a high refractive index was decreased in colorability and weather resistance. It can be confirmed that Comparative Example 4 using an acrylic copolymer having a low glass transition temperature was decreased in heat deflection temperature and weather resistance. It can be confirmed that Comparative Example 5 using a heat resistant copolymer and a low refractive index copolymer was not only decreased in colorability and heat resistance, but also scratch resistance, mechanical properties and weather resistance were decreased.

The invention claimed is:

1. A thermoplastic resin composition, comprising:
a first copolymer formed by polymerizing a monomer mixture of a (meth)acrylate-based monomer, a vinyl cyan-based monomer and a maleimide-based monomer, and having a refractive index of 1.5170 or less and a glass transition temperature of 115.0° C. or more; and
a second copolymer formed by graft-copolymerizing an aromatic vinyl-based monomer and a vinyl cyan-based monomer onto an acrylic rubber polymer,
wherein the acrylic rubber polymer has an average particle diameter of 50 to 500 nm.

2. The composition of claim 1, wherein the monomer mixture comprises
55 to 74 wt % of the (meth)acrylate-based monomer,
15 to 35 wt % of the vinyl cyan-based monomer, and
5 to 12 wt % of the maleimide-based monomer.

3. The composition of claim 1, wherein the monomer mixture does not comprise an aromatic vinyl-based monomer.

4. The composition of claim 1, wherein the monomer mixture comprises the (meth)acrylate-based monomer and the maleimide-based monomer at a weight ratio of 95:5 to 80:20.

5. The composition of claim 1, wherein the monomer mixture comprises the vinyl cyan-based monomer and the maleimide-based monomer at a weight ratio of 80:20 to 60:40.

6. The composition of claim 1, wherein the first copolymer has a refractive index of 1.5000 to 1.5170.

7. The composition of claim 1, wherein the first copolymer has a glass transition temperature of 115.0 to 129.0° C.

8. The composition of claim 1, wherein the second copolymer comprises:
a first graft copolymer prepared by graft-copolymerizing an aromatic vinyl-based monomer and a vinyl cyan-based monomer onto an acrylic rubber polymer having an average particle diameter of 50 to 200 nm; and
a second graft copolymer prepared by graft-copolymerizing an aromatic vinyl-based monomer and a vinyl cyan-based monomer onto an acrylic rubber polymer having an average particle diameter of 300 to 500 nm.

9. The composition of claim 1, wherein the weight ratio of the first copolymer to the second copolymer is 55:45 to 75:25.

10. The composition of claim 8, wherein the weight ratio of the first graft copolymer to the second graft copolymer is 75:25 to 95:5.

11. A thermoplastic resin molded part which is made of the thermoplastic resin composition of claim 1, and has a heat deflection temperature of 92.5° C. or more, an L value of 25.3 or less, and a pencil hardness of HB or more.

12. A thermoplastic resin composition, comprising:
a first copolymer formed by polymerizing a monomer mixture of a (meth)acrylate-based monomer, a vinyl cyan-based monomer and a maleimide-based monomer, and having a refractive index of 1.5170 or less and a glass transition temperature of 115.0° C. or more; and
a second copolymer formed by graft-copolymerizing an aromatic vinyl-based monomer and a vinyl cyan-based monomer onto an acrylic rubber polymer,
wherein the monomer mixture does not comprise an aromatic vinyl-based monomer.

13. A thermoplastic resin composition, comprising:
a first copolymer formed by polymerizing a monomer mixture of a (meth)acrylate-based monomer, a vinyl cyan-based monomer and a maleimide-based monomer, and having a refractive index of 1.5170 or less and a glass transition temperature of 115.0° C. or more; and
a second copolymer formed by graft-copolymerizing an aromatic vinyl-based monomer and a vinyl cyan-based monomer onto an acrylic rubber polymer,
wherein the second copolymer comprises:
a first graft copolymer prepared by graft-copolymerizing an aromatic vinyl-based monomer and a vinyl cyan-based monomer onto an acrylic rubber polymer having an average particle diameter of 50 to 200 nm; and
a second graft copolymer prepared by graft-copolymerizing an aromatic vinyl-based monomer and a vinyl cyan-based monomer onto an acrylic rubber polymer having an average particle diameter of 300 to 500 nm.

* * * * *